(12) United States Patent
Long et al.

(10) Patent No.: US 12,452,132 B1
(45) Date of Patent: Oct. 21, 2025

(54) METHOD AND DEVICE OF STACKING SYSTEM

(71) Applicant: TP-Link Systems Inc., Irvine, CA (US)

(72) Inventors: Xingzhi Long, Chengdu (CN); Chanpin Chen, Shenzhen (CN); Qi Zhang, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/080,681

(22) Filed: Mar. 14, 2025

(51) Int. Cl.
*H04L 41/0859* (2022.01)
*G06F 8/658* (2018.01)
*G06F 9/445* (2018.01)
*H04L 41/0816* (2022.01)
*H04L 45/16* (2022.01)

(52) U.S. Cl.
CPC .......... *H04L 41/0863* (2013.01); *G06F 8/658* (2018.02); *G06F 9/44505* (2013.01); *H04L 41/0816* (2013.01); *H04L 45/16* (2013.01)

(58) Field of Classification Search
CPC ....... H04L 43/16; H04L 45/583; H04L 45/02; H04L 43/0876; H04L 43/062; H04L 67/1097; H04L 41/0266; H04L 41/044; H04L 41/0863; H04L 41/0816; H04L 41/0866; G06F 8/658; G06F 11/1433; G06F 8/65; G06F 8/656
See application file for complete search history.

(56) References Cited

U.S. PATENT DOCUMENTS 9,367,301 B1 * 6/2016 Serrano ................... G06F 8/658
11,005,746 B1 * 5/2021 Kaliyamoorthy ....... H04L 43/16

FOREIGN PATENT DOCUMENTS

| CN | 101110782 | A | * | 1/2008 | |
|---|---|---|---|---|---|
| CN | 102661275 | A | * | 9/2012 | |
| CN | 107257323 | A | | 10/2017 | |
| CN | 107547276 | B | | 6/2021 | |
| CN | 118069332 | A | * | 5/2024 | |
| CN | 119109790 | A | * | 12/2024 | ......... H04L 41/0816 |
| WO | 2009062351 | A1 | | 5/2009 | |

* cited by examiner

*Primary Examiner* — Kyung H Shin
(74) *Attorney, Agent, or Firm* — Loeb & Loeb LLP (57) ABSTRACT

The disclosure provides a device and a method. The device of a stacking system includes: a memory; and one or more processors operatively coupled to the memory, the one or more processors configured to: determine that a master device managing the device of the stacking system has changed; roll back a process to a stage prior to loading configuration information; obtain configuration information of a changed master device; and load the configuration information of the changed master device.

18 Claims, 7 Drawing Sheets

METHOD AND DEVICE OF STACKING SYSTEM

TECHNICAL FIELD

The disclosure relates to the technical field of wireless communication, in particular to a device, a method for a stacking system.

BACKGROUND

Stacking technology refers to the method of interconnecting stackable switches through dedicated cables to create a single logical unit. The interconnected devices operate as a unified virtual switch, with all equipment within the stacking system maintaining consistent configurations. Externally, this system is perceived as a single switch, streamlining network management and operation. Communication and packet forwarding between devices are facilitated through proprietary stacking links, which occupy specific ports designated as stacking ports. These ports can be manually configured or automatically recognized, depending on the system's settings. Stacking technology includes two sub-technologies: stack merging technology and stack joining technology.

Stack merging technology involves combining two or more independently operating stacking systems into a single, unified stacking system. The process ensures that the newly formed stack continues to function as a cohesive entity, maintaining logical consistency across all previously independent systems. This technology enables the expansion and reconfiguration of network resources without compromising operational stability, making it suitable for scenarios requiring consolidation of network infrastructure.

Stack joining technology, a specific subset of stack merging technology, pertains to the addition of a new switch into an already stable stacking system. This process incorporates the new device seamlessly into the existing stack, ensuring configuration consistency and maintaining the logical behavior of the unified system. Stack joining is particularly beneficial for scaling network capacity incrementally while preserving the integrity and reliability of the current stacking system.

SUMMARY

According to an aspect of the present application, a device of a stacking system is provided. The device includes: a memory; and one or more processors operatively coupled to the memory, the one or more processors configured to: determine that a master device managing the device of the stacking system has changed; roll back a process to a stage prior to loading configuration information; obtain configuration information of a changed master device; and load the configuration information of the changed master device.

According to another aspect of the present application, a method is provided. The method includes determining that a master device managing a device of a stacking system has changed; rolling back a process to a stage prior to loading configuration information; obtaining configuration information of a changed master device; and loading the configuration information of the changed master device.

According to another aspect of the present application, a computer-readable storage medium, which has stored thereon computer programs which, when executed by the processor of the device, cause the processor to perform the method described above.

According to another aspect of present application, an electronic device is provided, which comprises: a processor, and a memory having stored there on computer programs which, when executed by the processor, cause the processor to perform the above method.

BRIEF DESCRIPTION OF THE DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings may be obtained according to these drawings of the embodiments of present application for those skilled in the art.

DETAILED DESCRIPTION

In order to provide a clearer and more complete description of the purpose, technical solution, and advantages of the present disclosure, the following description, in conjunction with the accompanying drawings, will provide a clear and comprehensive understanding of the technical solution in the present disclosure. It should be noted that the described embodiments are only a part of the embodiments disclosed herein, and not the entire embodiments. All other embodiments that ordinary skilled persons in the art may obtain without exercising inventive labor based on the embodiments disclosed herein are within the scope of the present disclosure.

The terms "first," "second," "third," "fourth," etc. (if present) used in the specification and claims, as well as in the accompanying drawings, are used to distinguish similar objects and are not necessarily used to describe a specific order or sequence. It should be understood that the use of such data may be interchangeable in appropriate circumstances, so that the embodiments of the present disclosure described herein may be implemented in an order other than that shown or described here.

It should be understood that the numbering of the processes in various embodiments of the present disclosure does not imply a specific order of execution. The execution order of the processes should be determined based on their functionality and inherent logic, and should not impose any limitations on the implementation process of the embodiments of the present disclosure.

It should be understood that the terms "comprising" and "having" and their variations intend to cover non-exclusive inclusion, such as a process, method, system, product, or device that includes a series of steps or units, not necessarily limited to those explicitly listed, but may include other steps or units that are inherently present in these processes, methods, products, or apparatus.

It should be understood that the term "multiple" means two or more. The term "and/or" is merely a description of the associated relationship between related objects, indicating that there may be three possible relationships. For example, "A and/or B" may mean: A exists alone, A and B exist simultaneously, or B exists alone. The character "/" generally indicates an "or" relationship between the preceding and following related objects. "Including A, B, and C," "including A, B, C" means that A, B, and C are all included, and "including A, B, or C" means that one of A, B, and C is included. "Including A, B and/or C" means that any one or two or all three of A, B, and C are included.

It should be understood that "corresponding to B with A," "corresponding to A with B," "A corresponds to B," or "B corresponds to A" means that B is associated with A and may be determined based on A. Determining B based on A does not mean that B may only be determined based on A, but may also be determined based on A and/or other information. The matching of A and B means that the similarity between A and B is greater than or equal to a predetermined threshold.

Depending on the context, the term "if" used herein may be interpreted as "when" or "in response to determining" or "in response to detecting."

The following specific embodiments will provide a detailed description of the technical solution of the present disclosure. These specific embodiments may be combined with each other, and certain concepts or processes may not be reiterated in some embodiments if they are the same or similar. In order to provide a clearer understanding of the purpose, technical solution, and advantages of the present disclosure, the following description will be provided in conjunction with the accompanying drawings.

Stacking technology enables multiple stackable switches to be interconnected and virtualized into a single logical system. In this system, all devices maintain configuration consistency, with one device serving as a master device and other devices serving as member devices. Stack merging technology and stack joining technology are subsets of stacking technology, both involving the integration of member devices (e.g., switches) into an existing or new stacking system. Stack merging combines two or more independent stacks into a unified system, while stack joining introduces a new member device into an already stable stack. Both processes rely on identifying and configuring the master device or member device to ensure consistency across the system.

The existing limitations of stacking technology, particularly in stack merging and stack joining, stem from the single master device architecture. In both scenarios, the system requires a re-election of the master device, and member devices must restore to a default initialized state to complete virtualization. Upon detecting changes in the master device, all member devices must reset, leading to delays. The current stacking technology relies on rebooting devices to restore their default state, which results in a lengthy merging or joining process. These delays are exacerbated when the system is large or complex, reducing operational efficiency.

Traditionally, stack merging technology employs software-controlled reboot methods to reinitialize devices and restore them to a default state. During this process, the master device typically controls the reboot process, with member devices either self-rebooting upon detecting a master device change or responding to centralized reboot commands. Users may alternatively manually issue reboot commands for individual systems and physically reconnect stack cables. However, this approach introduces operational inefficiencies, as devices must complete comprehensive startup procedures before integration, prolonging the entire virtualization process.

For stack joining, traditional approaches employ hardware reboot methods, which involve power cycling devices to reset them to their fundamental configuration state. This procedure is particularly prevalent when introducing a new switch to an existing stack infrastructure. The hardware reboot process necessitates complete device power-down and subsequent reboot following stack port configuration. While this method ensures precise device state restoration, it simultaneously introduces considerable operational complexity and deployment delays. Automated configuration through proprietary stacking cables may mitigate some complexity, though at the expense of increased deployment costs. Compared to software-controlled alternatives, hardware rebooting demands more extensive manual intervention, including physical power cycling, thereby further compromising the overall stacking process efficiency.

Stack joining and stack merging technology also includes an automatic stacking method based on wireless detection. This method enables a device to use its wireless capabilities during initialization to establish a connection with the target device. Stacking parameters are then automatically negotiated, confirmed, and written to the devices, reducing user interaction while achieving automatic stacking upon device startup. However, the method shares similarities with those relying on dedicated stacking cables. In stack merging scenarios, member devices still require a reboot. Additionally, this method necessitates wireless functionality in the devices and recognizes only devices of the same model as the master device as eligible targets, limiting its applicability.

The performance and results of the automatic stacking methods are similar to those of dedicated stacking cable technologies. Both approaches require member devices to reboot during stack merging. Furthermore, the wireless-based method imposes additional constraints, as it only supports devices with wireless functionality and restricts compatibility to identical models. These limitations narrow the range of applicable scenarios and operational flexibility.

Current stack joining and stack merging processes uniformly require member devices to undergo a complete reboot. This requirement results in prolonged operational timelines due to extensive manual intervention and increases overall deployment costs. The inefficiencies inherent in such processes raise concerns regarding the practicality of these technologies in scenarios demanding faster deployment and reduced operational overhead.

To address these limitations, the present disclosure proposes an improvement to stack technology. In one aspect, the present disclosure provides a method including determining that a master device of a stacking system has changed; rolling back a process to a stage prior to loading configuration information; obtaining configuration information of the changed master device; and loading the configuration information of the changed master device.

In an aspect of the present disclosure, a process state rollback module is introduced, enabling processes already in the operational state to revert to the pre-configuration stage.

Configuration files from the master device are subsequently loaded, eliminating the need for device reboots.

By implementing embodiments of the present disclosure, enhancements to switch stacking technology are achieved. A soft reboot method is provided within the stacking system, allowing devices to transition quickly to the default initialization state without performing a complete reboot. The embodiments of the present disclosure reduce the time required for stack merging processes, resulting in improved operational efficiency and cost-effectiveness.

An application scenario 10 according to an embodiment of the present disclosure will be described with reference to FIG. 1, which illustrates a stack merging scenario. In this scenario, the purpose of stack merging is to combine two or more existing stacking systems into a single stacking system efficiently. The merging process applies to devices already in an operational state, allowing direct configuration of stack ports without requiring a full system reboot.

Figure 1:
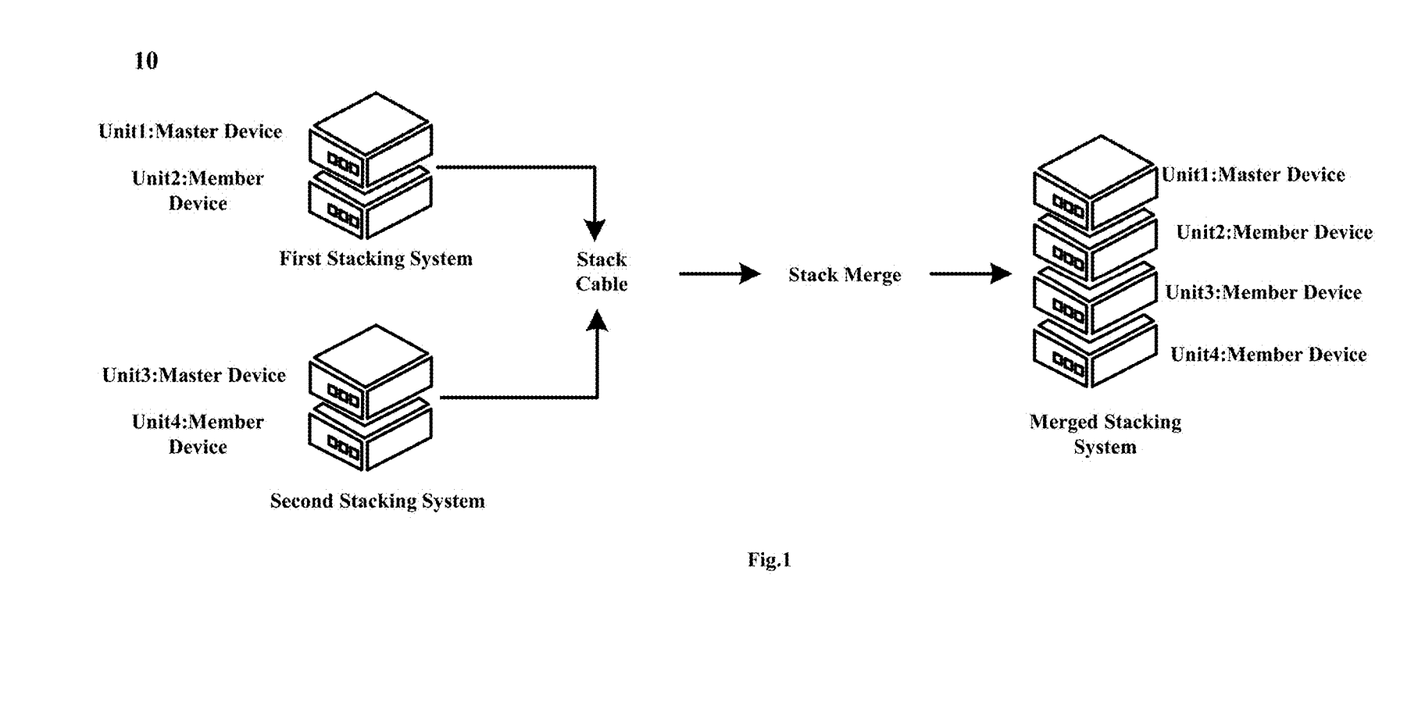
FIG. 1 illustrates a schematic diagram of an application scenario according to an embodiment of the present disclosure.

As shown in FIG. 1, stack merging involves multiple stacking systems that belong to the same stack series, ensuring compatibility among devices (e.g. switches). Each device within the stack series may participate in the merging process, provided the total number of devices does not exceed the maximum stacking capacity of the series. The connection cables used must meet the speed requirements of the configured stack ports. Before merging, each stacking system (e.g., a first stacking system or a second stacking system) may consist of one or more devices. After the merging process, the virtualized system (e.g., a merged stacking system) assigns unique unit IDs to member devices, managed by the master device selected during the merging. No duplicate unit IDs exist in the merged system.

In this context, a "switch" refers to a network device capable of interconnecting and managing data flows among multiple devices. A "stacking system" is a collection of interconnected switches that function as a unified system, with one master device managing the configuration and operation of member devices. The present disclosure is not limited thereto.

Although the described example focuses on a stack merging scenario, the present disclosure is also applicable to other scenarios, such as stack joining. For instance, in a stack joining scenario, a member device may be added to an existing stacking system. The joining device is configured to meet the stacking system's series requirements, such as identical stack port speed configurations and compatibility with the system's maximum stacking capacity. Upon joining, the master device of the stacking system assigns the joining device a unique unit ID to ensure seamless integration without disruption to the system's operation.

An aspect of the present disclosure enhances the efficiency of both stack merging and stack joining processes by eliminating unnecessary device reboots. The aspect of the present disclosure reduces deployment complexity and ensures a consistent and scalable framework for managing stacking systems in various network environments.

Figure 2:
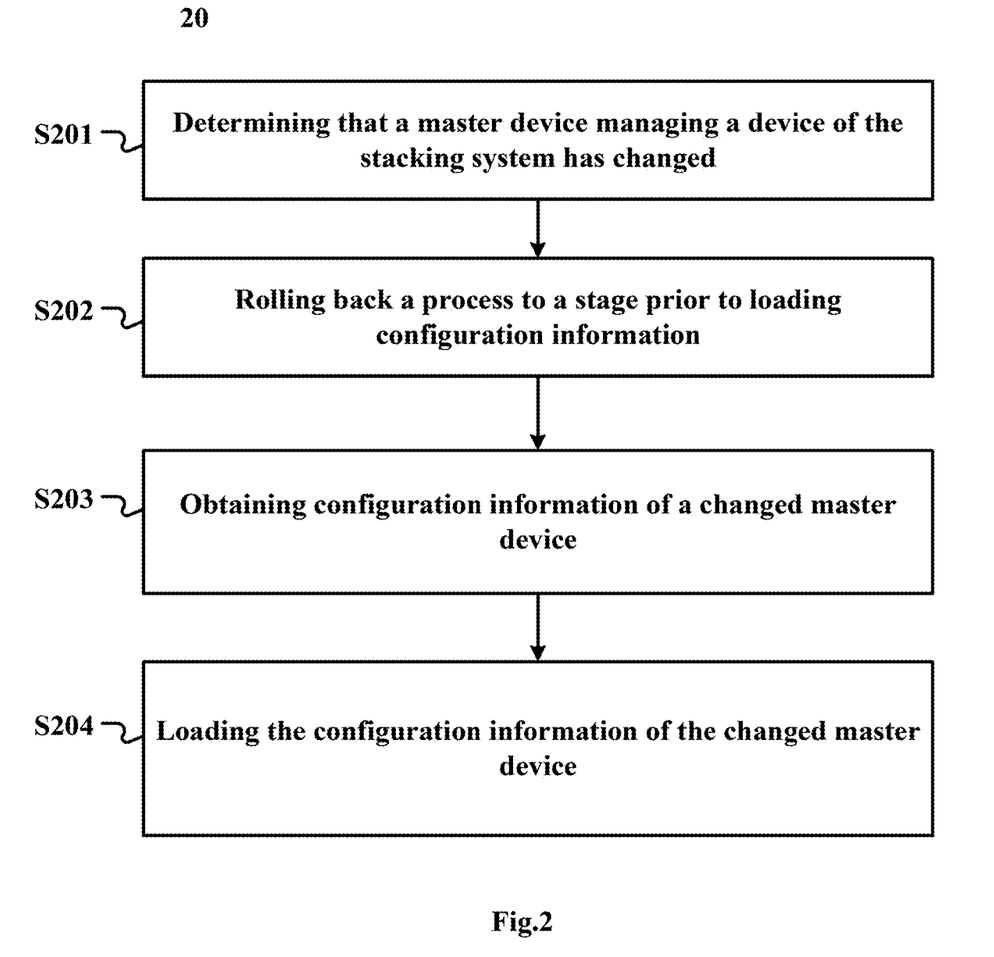
FIG. 2 illustrates a schematic diagram of a method according to an embodiment of the present disclosure.

FIG. 2 illustrates method 20 according to an embodiment of the present disclosure. Method 20 is executed by a device of a stacking system, which may be a switch. This device includes a memory and one or more processors operatively coupled to the memory. The one or more processors may work in coordination with other components of the switch. For example, these components may include stacking-related modules such as stacking ports, communication module and synchronization module. The switch is defined as being applicable to a stacking system, where multiple switches function as a cohesive unit. Of course, the present disclosure is not limited to these examples of switches.

Optionally, method 20 eliminates unnecessary device reboots. Consequently, method 20 is referred to as a soft-reboot method. Method 20 includes steps S201-S204, and may optionally include more or fewer steps. Of course, the present disclosure is not limited thereto.

At step S201, the device determines that a master device managing a device of a stacking system has changed.

For example, the master device belongs to a first stacking system. In the scenario where a stacking system is joined, the device may act as a member device preparing to join the first stacking system. In the scenario of merging two stacking systems, the device belongs to a second stacking system to be merged into the first stacking system. In both scenarios, the device functions as a member device. Of course, the present disclosure is not limited to these specific cases.

The master device of the first stacking system is defined as the device responsible for processing operational traffic within the stacking system. In contrast, member devices do not process such traffic, which eliminates the potential for resource conflicts. Accordingly, member devices do not require resource suspension or release. Of course, the present disclosure is not limited thereto.

At step S202, the device rolls back a process to a stage prior to loading configuration information.

For example, a process may be an ongoing process occurring within the device (the switch). The process typically involves state transitions, configuration tasks, or protocol exchanges necessary for the member switch to function cohesively within the stacking system. For example, all the ongoing processes running on the device are rolled back to a stage prior to loading configuration information.

For example, rolling back refers to reverting the process state to an earlier stage. A stage prior to loading configuration information may be the preloading stage of the initialization process. By performing this rollback, the device clears configurations that cannot be removed during the default configuration loading stage. Of course, the present disclosure is not limited thereto.

At step S203, the device obtains configuration information of the changed master device. For example, this configuration information includes parameters necessary for the device to integrate into the first stacking system. The information is transmitted from the changed master device to the member device. Of course, the present disclosure is not limited thereto.

At step S204, the device loads the configuration information of the changed master device. By loading this configuration information, the stacking virtualization process is completed. The device is thereby integrated into a stacking system, enabling it to function within the operational parameters established by the master device. Of course, the present disclosure is not limited thereto.

As described in previous solutions, when a master device in a first stacking system changes, device reboots are typically required. However, method 20 performs process rollback to the pre-configuration stage (i.e., the stage prior to loading configuration information). During the initialization process, the member device then loads the relevant configuration from the master device, completing stacking virtualization. By reverting to the pre-configuration stage and loading the configuration sent by the master device, device reboots are avoided.

Method 20 enables the device to quickly enter a default initialization state without requiring a reboot, thereby reducing the time required for the stacking system merger process.

Optionally, step S205 is performed to synchronize operational data with the changed master device. Of course, the present disclosure is not limited to these implementations.

Optionally, after the device, functioning as a member device, completes configuration loading, the master device synchronizes operational data to the member device. When the master device fails, the member device retains all user configurations and operational data. Therefore, when the member device is promoted to the master device role, it may seamlessly take over operational processing from the original master device. This minimizes service disruption in scenarios where the backup device is promoted to master. Of course, the present disclosure is not limited thereto.

Figure 3:
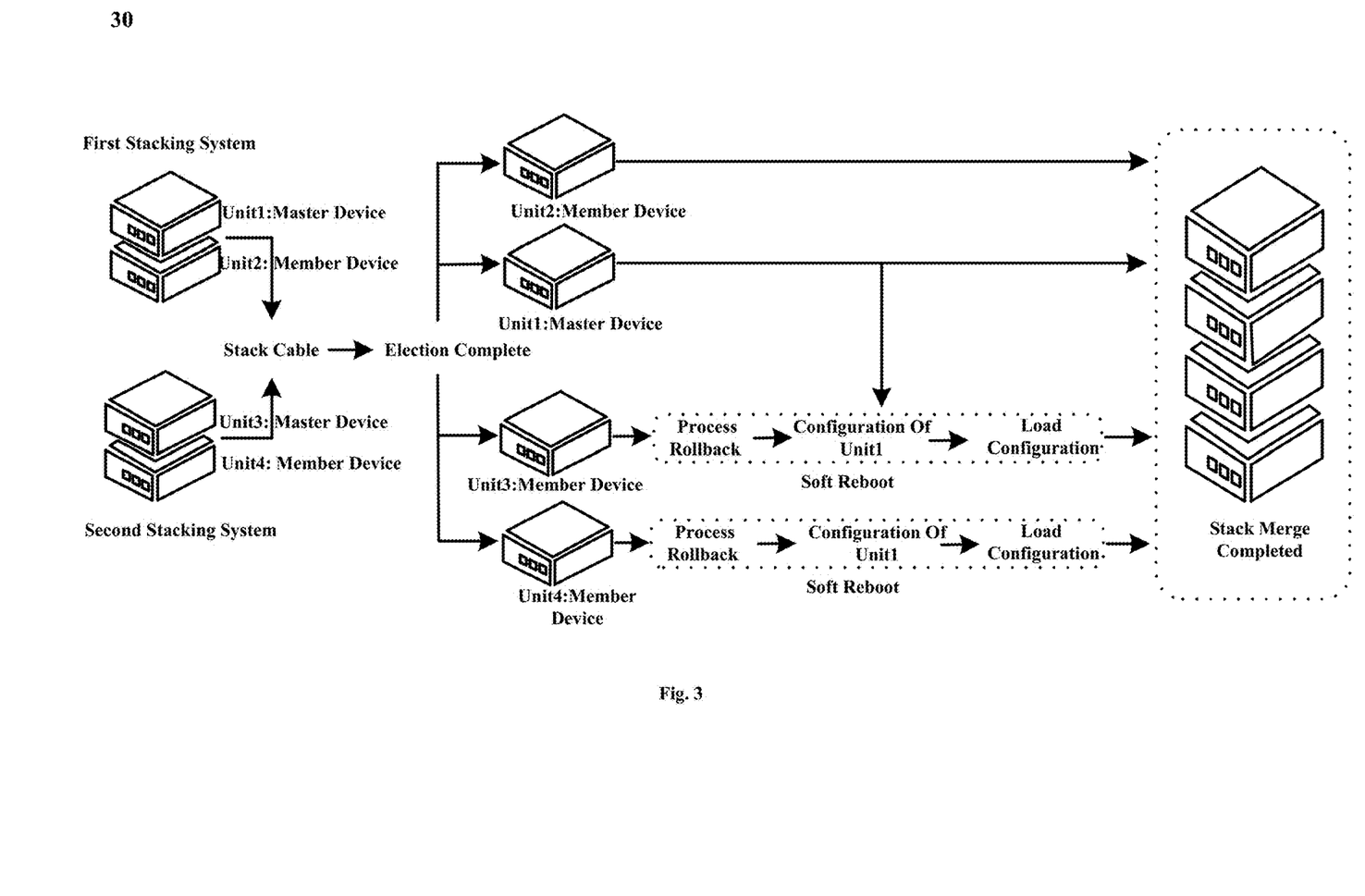
FIG. 3 illustrates a schematic diagram of applying a method to the scenario of merging two stacking systems.

FIG. 3 illustrates a schematic diagram of applying method 20 to the scenario of merging two stacking systems. FIG. 3 describes some details of method 20 in the context of stack merging.

In the example of FIG. 3, the master device belongs to a first stacking system, and the device is managed by a master device of a second stacking system before the second stacking system to be merged with the first stacking system.

In an aspect of the present disclosure, at step S201, the device may join an election for the master device for a merged stacking system combining the second stacking system and the first stacking system. The device then may obtain an election result of the election for the master device in the merged stacking system; and based on the election result, determine that the master device managing the device of the stacking system has changed. For example, the election result may indicate that no device in the second stacking system serves as the master device of the merged system. For example, the election result may further indicate that the master device in the first stacking system serves as the changed master device. Of course, the present disclosure is not limited thereto.

As illustrated in FIG. 3, when devices within the first stacking system and the second stacking system are merged as the merged stacking system, it may be necessary for all the devices in the two stacking systems, including master devices and member devices, to evaluate whether configuration adjustments are required. Following the completion of stacking port configurations and the establishment of physical connections through cables, the devices proceed to the device election phase. This election phase serves to identify the final master device for the combined/merged stacking system. All the devices in the two stacking systems may join the election. Optionally, after completing the election phase and determining the master device, each member device may assess whether a soft-reboot operation is needed, contingent on whether the master device has changed.

In cases where a change in the master device is detected, member devices may perform a soft-reboot operation. However, not all member devices necessitate a soft-reboot; for instance, certain devices may already possess configurations that align with the requirements of the merged stacking system. Devices meeting this criterion are not subject to the soft-reboot process.

In the example depicted in FIG. 3, the device 'unit 1' retains its role as the master device both prior to and following the election. Additionally, the device 'unit 2', remaining in the same stacking system as the master device 'unit 1', maintains configurations and operational states identical to those of the new master device 'unit 1'. As a result, a soft-reboot operation is unnecessary for this device. Conversely, devices 'unit 3' and 'unit 4', originating from the second stacking system and newly integrated into the first stacking system, require synchronization of their configurations and operational states with the new master device 'unit 1'. These devices must first revert their original configurations and states to default values and subsequently perform a soft-reboot operation as described in method 20. Once all devices have finalized their configurations, virtualization of the stacking system is considered complete.

The aspect of the present disclosure facilitates a reduction in unnecessary device reboots. By limiting soft-reboot operations to devices requiring configuration or operational state updates, the overall duration for merging stacking systems is reduced. Moreover, this aspect of the present disclosure contributes to a merging process that mitigates disruption to ongoing operations.

Figure 4:
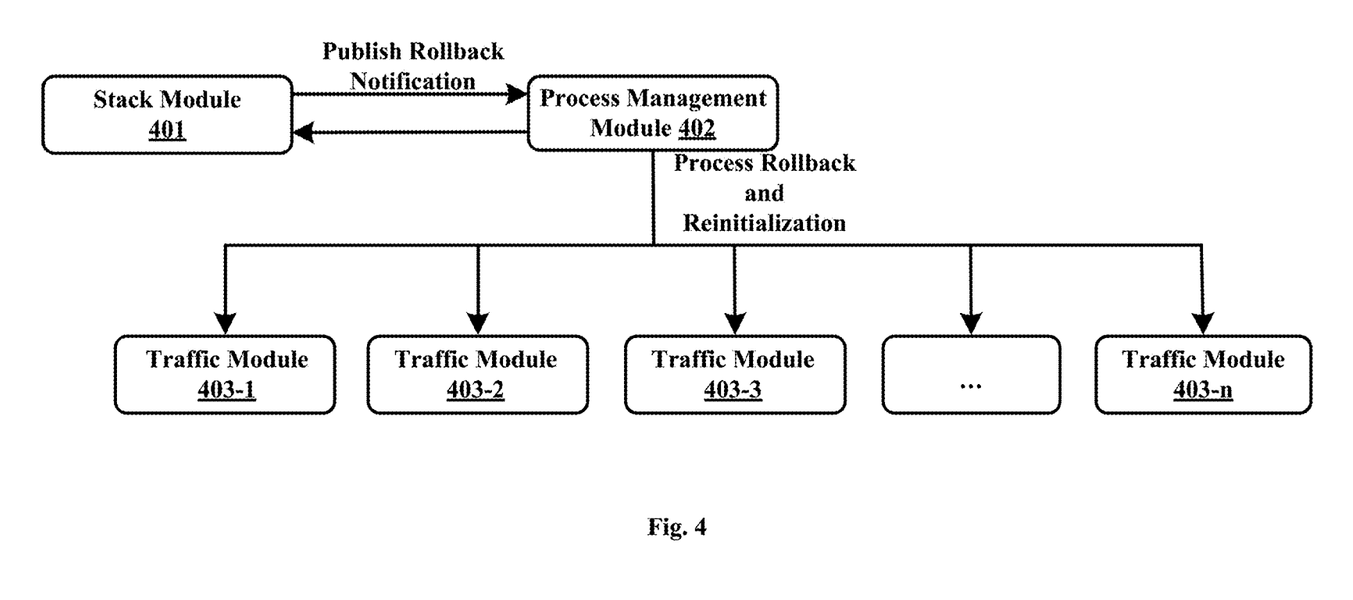
FIG. 4 illustrates a schematic diagram of a device that executes a method according to the present disclosure.

FIG. 4 illustrates a schematic diagram of a device that executes method 20 according to the present disclosure. The device includes a stacking module 401, a process management module 402, and multiple traffic modules 403-1, 403-2, . . . , 403-n. Each traffic module corresponds to one ongoing process. These modules remain decoupled to allow independent operation and maintenance, which further reduces complexity and increases fault tolerance.

The stacking module 401 controls stacking and merging operations. It manages tasks such as stacking port configuration and master-election. After the election phase, the stacking module 401 determines if the master device has changed. The stacking module 401 decides if a soft reboot is necessary. If required, it sends a soft reboot notification to the process management module 402. The process management module 402 issues a rollback message to all processes. Each process performs a state rollback as directed.

The traffic modules 403-1, 403-2, . . . , 403-n receive rollback messages from the process management module 402. Each traffic module 403 executes a state-by-state rollback to restore the process to the stage prior to loading configuration information. At least two processes may exist at the same time. Thus, multiple traffic modules 403-1, 403-2, . . . , 403-n may execute the state-by-state rollback in parallel to restore the at least two processes to the stage prior to loading configuration information.

After the rollback, the traffic modules 403-1, 403-2, . . . , 403-n obtain configuration information from the changed master device. Each module loads this configuration to ensure consistency across devices. The stacking module 401 continues stacking and merging operations. This process ensures uniform configuration and state throughout the system.

Figure 5:
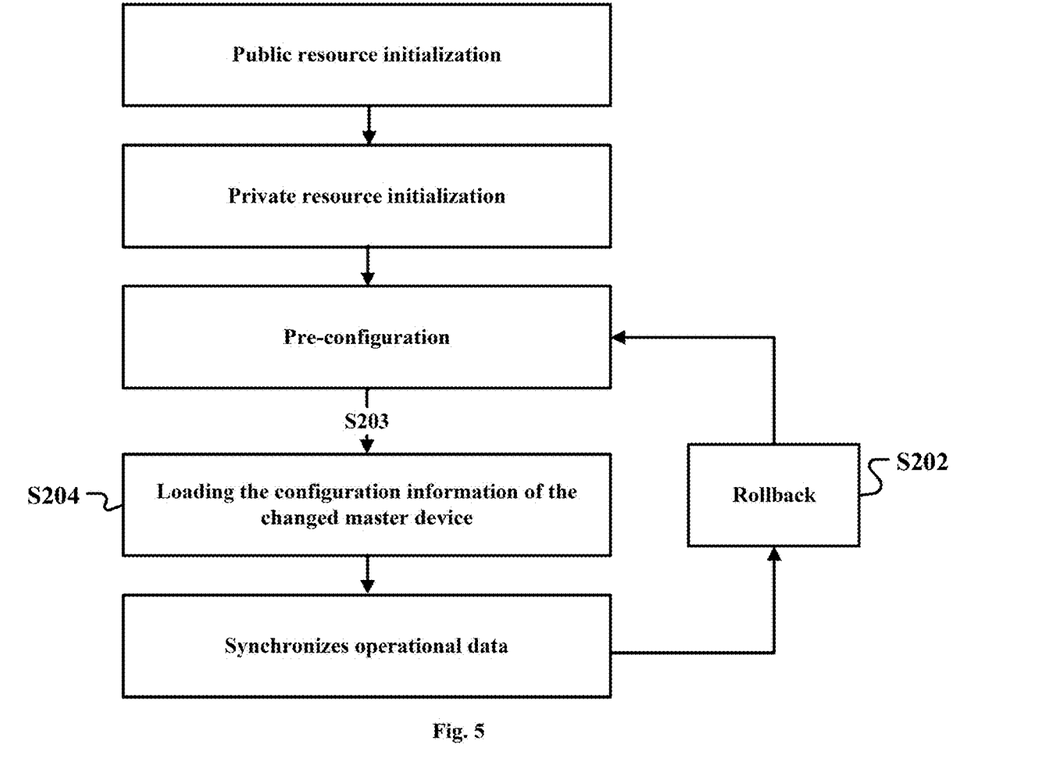
FIG. 5 illustrates a schematic diagram of the lifecycle of the process according to the embodiments of the present disclosure.

FIG. 5 illustrates a schematic diagram of the lifecycle of the process according to the embodiments of the present disclosure. FIG. 5 describes the details of steps S202 to S204. The initiation of a process in a switch generally includes several stages. These stages include public resource initialization, private resource initialization, pre-configuration, default configuration loading, configuration file loading, and data synchronization.

Public resource initialization refers to the setup of shared resources required for basic operations. Private resource initialization involves preparing resources specific to individual processes. Traditionally, these steps occur during stacking and merging through a reboot, which is time-consuming. In an aspect of the present disclosure, these steps are not required. In step S202, each process rolls back to a stage before loading configuration information. As shown in FIG. 5, rollback resets the process to the pre-configuration stage. Obtaining new configuration information ensures smooth configuration reloading. Rollbacks occur in parallel for processes, reducing time and avoiding configuration conflicts. In stacking systems, service processing is managed by the master device. The member device does not handle services, preventing resource conflicts and eliminating the need to suspend or release resources.

After completing rollback, processes proceed to step S203 and obtain the configuration information of the changed master device. Step S204 then begins. Step S204 includes determining incomplete prerequisite operations, executing these operations, and loading the configuration information of the changed master device. During the pre-configuration stage, each process evaluates whether the prerequisite operations for configuration have been completed. Completed operations are skipped. When method 20 is applicable, most prerequisite operations are typically already completed.

During the default configuration loading stage, the system performs default configuration loading after executing pre-configuration operations. The device replaces its existing configuration with default settings. This ensures a consistent starting point for further configurations.

In the configuration loading stage, member devices restore default configurations and then load the changed master device's configuration. This step ensures consistent configurations between the master and member devices in the stacking system.

At least one aspect of the present disclosure also supports traffic backup. After configuration loading, the master device synchronizes operational data with the member device. If the master device fails, the member device, having retained user configurations and operational data, seamlessly assumes the role of the master device. This may further reduce the impact on services during the master-to-member transition.

Figure 6:
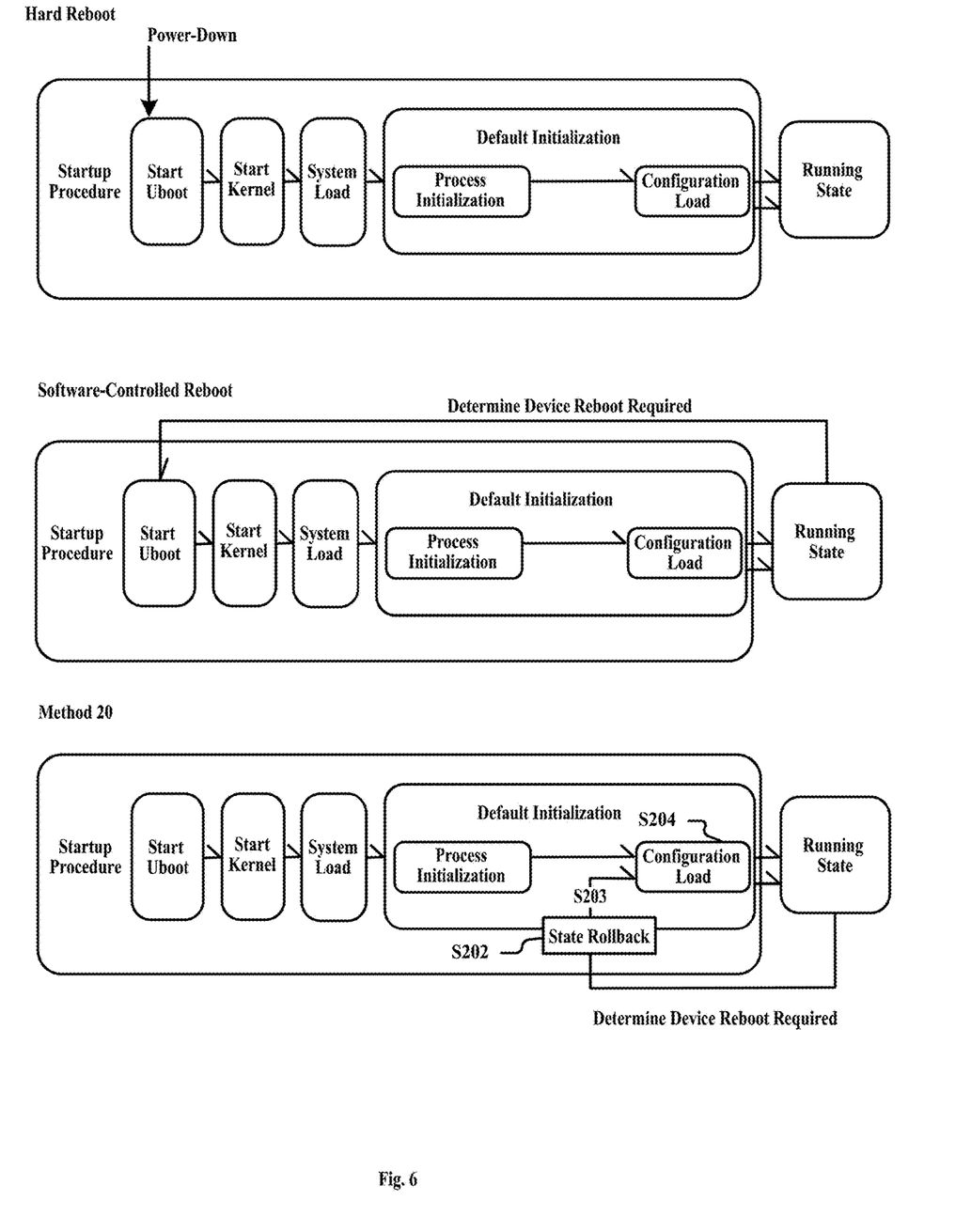
FIG. 6 illustrates a schematic diagram comparing the lifecycle of the process according to the embodiments of the present disclosure with traditional hard reboot and software-controlled reboot processes.

FIG. 6 illustrates a schematic diagram comparing the lifecycle of the process according to the embodiments of the present disclosure with traditional hard reboot and software-controlled reboot processes. This comparison highlights the details of steps S202 to S204.

In the traditional hard reboot process, as shown in FIG. 6, the process begins with a power-off event, followed by the initiation of uboot, kernel startup, system loading, and default initialization. Before default initialization, the rebooted device already holds the configuration information of the master device. Subsequently, the device proceeds with initialization and configuration loading until it reaches the operational state. During this sequence, kernel or uboot startup identifiers change, and a reset identifier for CPU, DRAM, or communication chips indicates that a reset has occurred.

When an operational device determines that a master device in a first stacking system has changed, it may trigger a software-controlled reboot. The startup sequence in this case also includes the initiation of uboot, kernel startup, system loading, and default initialization. Similar to a hard reboot, the device retains the master device's configuration information before default initialization. It then continues with initialization and configuration loading until reaching the operational state. This process also involves changes in kernel or uboot startup identifiers and reset identifiers for CPU, DRAM, or communication chips, signaling a reset event.

In contrast, embodiments of the present disclosure allow an operational device to determine that a master device managing the device in a stacking system has changed and proceed directly with steps S202 to S204. In this scenario, the device rolls back a process to a stage prior to loading configuration information, completes configuration loading, and transitions directly to the operational state. Throughout this process, kernel or uboot startup identifiers remain unchanged. Additionally, at least one of the following conditions is met: the reset identifier for CPU indicates no reset occurred, the reset identifier for DRAM indicates no reset occurred, or the reset identifier for communication chips indicates no reset occurred. Furthermore, in some embodiments of the present disclosure ensure, process identifiers (PIDs) for processes remain unchanged.

Compared to traditional hard and software-controlled reboots, the embodiments eliminate the need for uboot startup, kernel startup, system loading, public resource initialization, and private resource initialization, thereby reducing time consumption. The rollback process mainly addresses configurations that default configuration loading fails to reset. Such configurations are relatively rare, reducing the time required for rollback. Additionally, as pre-operations have already been executed once, the pre-configuration phase in the soft-reboot process requires less time than during a standard configuration phase. Overall, the rollback process introduces negligible latency to system recovery.

Figure 7:
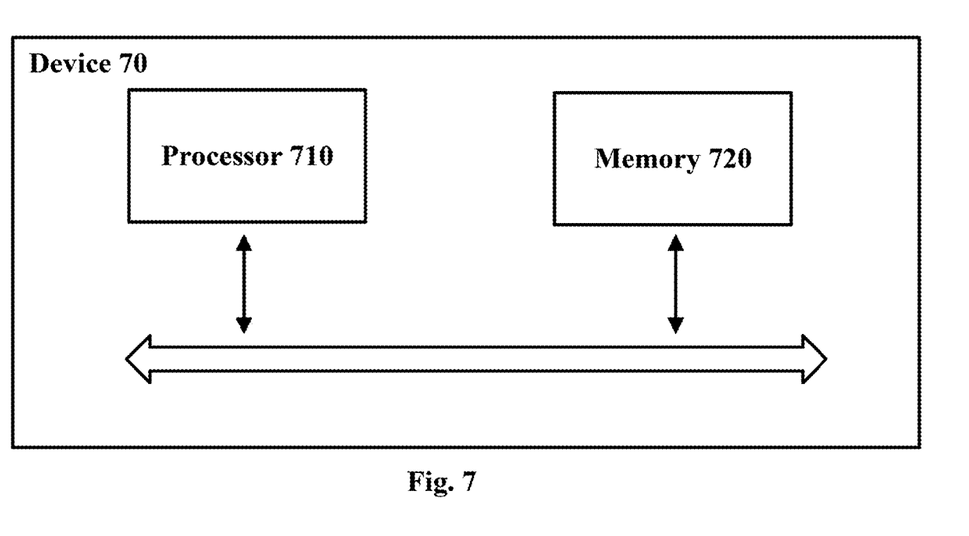
FIG. 7 shows an exemplary block diagram illustrating a device according to the embodiments of the disclosure.

FIG. 7 shows an exemplary block diagram illustrating a device 70 according to the embodiments of the disclosure.

It should be noted that the computing device depicted in FIG. 7 may correspond to one or more of the member devices or master devices as described in FIGS. 1-6 and may be used to perform the actions involved in the stacking system, for example, the method 20 as described above.

As shown in FIG. 7, device 70 may comprise processor 710 and memory 720. The processor 710 is communicatively coupled with the memory 720 via a bus and configured to perform the methods discussed above.

Examples of the processor 710 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 710 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 720.

The memory 720 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 720 may reside in the processor 710, external to the processor 710, or distributed across multiple entities including the processor 710. The memory 720 may be embodied in a computer program product.

By way of example, a computer program product may include a computer-readable medium in packaging materials. Those skilled in the art will recognize how to implement the described functionality presented throughout this disclosure depending on the particular application and the overall design constraints imposed on the overall system.

According to another aspect of the present disclosure, there is provided a computer-readable storage medium for storing a computer-readable program, the program causing a computer to perform the method for wireless communication as described above.

It is noted that one or more blocks (or operations) described with reference to FIGS. 1-7 may be combined with one or more blocks (or operations) described with reference to another of the figures.

Techniques for wireless communication may include additional aspects, such as any single aspect or any combination of aspects described below and/or in connection with one or more other processes described elsewhere herein.

In a first aspect, a device of a stacking system is provided, wherein the device includes: a memory; and one or more processors operatively coupled to the memory, the one or more processors configured to: determine that a master device managing the device of the stacking system has changed; roll back a process to a stage prior to loading configuration information; obtain configuration information of a changed master device; and load the configuration information of the changed master device.

In a second aspect, alone or in combination with any other aspect, wherein the master device belongs to a first stacking system, and the device is a member device preparing to join the first stacking system.

In a third aspect, alone or in combination with any other aspect, wherein the master device belongs to a first stacking system, and the device is managed by a master device of a second stacking system before the second stacking system to be merged with the first stacking system, and to determine that a master device managing the device of the stacking system has changed, the one or more processors configured to: join in an election for a master device in a merged stacking system combining the second stacking system and the first stacking system; obtain an election result of the election for the master device in the merged stacking system; and based on the election result, determine that the master device managing the device of the stacking system has changed, wherein the election result further indicates that no device in the second stacking system serves as the master device of the merged system.

In a fourth aspect, alone or in combination with any other aspect, the election result further indicates that the master device in the first stacking system serves as the master device of the merged system.

In a fifth aspect, alone or in combination with any other aspect, wherein to roll back a process to a stage prior to loading configuration information, the one or more processors is configured to: receive a rollback message from a process management module; and execute a state-by-state rollback to restore the process to the stage prior to loading configuration information.

In a sixth aspect, alone or in combination with any other aspect, wherein at least two processes exist, and to execute a state-by-state rollback to restore the process to the stage prior to loading configuration information, the one or more processors is configured to: execute the state-by-state rollback in parallel to restore the at least two processes to the stage prior to loading configuration information.

In a seventh aspect, alone or in combination with any other aspect, wherein to load the configuration information to the changed master device, the one or more processors is configured to: in responding to determining that incomplete prerequisite operations exist; execute incomplete prerequisite operations; and load the configuration information of the changed master device.

In an eighth aspect, alone or in combination with any other aspect, wherein the one or more processors is further configured to: synchronize operational data with the changed master device.

In a ninth aspect, alone or in combination with any other aspect, wherein after loading the configuration information of the changed master device, an identifier of kernel startup or an identifier of uboot startup remains unchanged.

In a tenth aspect, alone or in combination with any other aspect, wherein after loading the configuration information of the changed master device, a reset identifier for CPU indicates no reset occurred; or a reset identifier for DRAM indicates no reset occurred; or a reset identifier for communication chips indicates no reset occurred.

In an eleventh aspect, alone or in combination with any other aspect, a method is provided. The method includes: determining that a master device managing a device of a stacking system has changed; rolling back a process to a stage prior to loading configuration information; obtaining configuration information of the changed master device; and loading the configuration information of the changed master device.

In a twelfth aspect, alone or in combination with any other aspect, wherein the master device belongs to a first stacking system, and the device is a member device preparing to join the first stacking system.

In a thirteenth aspect, alone or in combination with any other aspect, wherein the master device belongs to a first stacking system, and the device is managed by a master device of a second stacking system before the second stacking system to be merged with the first stacking system, and the determining that a master device managing a device of a stacking system has changed comprises: joining in an election for the master device for a merged stacking system combining the second stacking system and the first stacking system; obtaining an election result of the election for the master device in the merged stacking system; and based on the election result, determining that the master device managing the device of the stacking system has changed, wherein the election result indicates that no device in the second stacking system serves as the master device of the merged system.

In a fourteenth aspect, alone or in combination with any other aspect, wherein the election result further indicates that the master device in the first stacking system serves as the master device of the merged stacking system.

In a fifteenth aspect, alone or in combination with any other aspect, wherein the rolling back a process to a stage prior to loading configuration information comprises: receiving a rollback message from a process management module; and executing a state-by-state rollback to restore the process to the stage prior to loading configuration information.

In a sixteenth aspect, alone or in combination with any other aspect, wherein at least two processes exist, and the executing a state-by-state rollback to restore the process to the stage prior to loading configuration information comprises: executing the state-by-state rollback in parallel for the at least two processes to restore the at least two processes to the stage prior to loading configuration information.

In a seventeenth aspect, alone or in combination with any other aspect, wherein the loading the configuration information to the changed master device comprises: determining that incomplete prerequisite operations exist; executing incomplete prerequisite operations; and loading the configuration information of the changed master device.

In an eighteenth aspect, alone or in combination with any other aspect, the method further includes: synchronizing operational data with the changed master device.

In a nineteenth aspect, alone or in combination with any other aspect, wherein after loading the configuration information of the changed master device, an identifier of kernel startup or an identifier of uboot startup remains unchanged.

In a twentieth aspect, alone or in combination with any other aspect, wherein after loading the configuration information of the changed master device, a reset identifier for CPU indicates no reset occurred; or a reset identifier for DRAM indicates no reset occurred; or a reset identifier for communication chips indicates no reset occurred.

Those of skill would appreciate that the logical blocks, circuits, and algorithm steps described here may be implemented as electronic hardware, computer software, or a combination. This interchangeability of hardware and software is shown by the illustrative components described functionally. Whether the functionality is implemented in hardware or software depends on the application and constraints. Experts may implement the functionality in various ways for each application, but those choices do not depart from the scope here. Experts also recognize the examples of components, methods, and interactions here are merely illustrative; the components, methods, or interactions may be combined or performed differently.

The illustrative logic, blocks, circuits, and processes described may be implemented as hardware, software, or a combination. This hardware and software interchangeability has been described generally in terms of functionality and illustrated in the components, blocks, circuits, and processes. Whether the functionality is implemented in hardware or software depends on the application and constraints.

In an embodiment of the present disclosure, the processor may be a logic computing device with data processing capabilities and/or program execution capabilities, such as a central processing unit (CPU), a field programmable logic array (FPGA), a single chip microcomputer (MCU), a digital signal processor (DSP), an application specific integrated circuit (ASIC), or the like. The memory may be, for example, a volatile memory and/or a non-volatile memory. The volatile memory may include, for example, a random access memory (RAM) and/or a cache (Cache) or the like. The non-volatile memory may include, for example, a read only memory (ROM), a mechanical hard disk (HDD), a solid state drive (SSD), a flash memory (Flash), a USB flash drive, a memory card (SD, CF, MicroSD, etc.), and the like.

It will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "data block", "circuit", "engine", "unit," "circuit," or "system". Furthermore, aspects of the present disclosure may take the form of a computer program product embodied in one or more computer-readable media having computer-readable program code embodied thereon.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art may easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

What claimed is:

1. A device of a stacking system comprising:
   a memory; and
   one or more processors operatively coupled to the memory, the one or more processors configured to:
   determine that a master device managing the device of the stacking system has changed;
   roll back a process to a stage prior to loading configuration information;
   obtain configuration information of a changed master device; and
   load the configuration information of the changed master device,
   wherein after loading the configuration information of the changed master device, an identifier of kernel startup or an identifier of uboot startup remains unchanged, indicating that no device reboot has occurred.

2. The device according to claim 1, wherein the master device belongs to a first stacking system, and the device is managed by a master device of a second stacking system before the second stacking system to be merged with the first stacking system, and to determine that a master device managing the device of the stack system has changed, the one or more processors configured to:
   join in an election for a master device for a merged stacking system combining the second stacking system and the first stacking system;
   obtain an election result of the election for the master device in the merged stacking system; and based on the election result, determine that the master device managing the device of the stacking system has changed, wherein the election result indicates that no device in the second stacking system serves as the master device of the merged system.

3. The device according to claim 2, wherein the election result further indicates that the master device in the first stacking system serves as the master device of the merged system.

4. The device according to claim 1, wherein to roll back a process to a stage prior to loading configuration information, the one or more processors is configured to:
   receive a rollback message from a process management module; and
   execute a state-by-state rollback to restore the process to the stage prior to loading configuration information.

5. The device according to claim 4, wherein at least two processes exist, and to execute a state-by-state rollback to restore the process to the stage prior to loading configuration information, the one or more processors is configured to:
   execute the state-by-state rollback in parallel for the at least two processes to restore the at least two processes to the stage prior to loading configuration information.

6. The device according to claim 1, wherein to load the configuration information of the changed master device, the one or more processors is configured to:
   in responding to determining that incomplete prerequisite operations exist, execute incomplete prerequisite operations; and
   load the configuration information of the changed master device.

7. The device according to claim 1, wherein the one or more processors is further configured to:
   synchronize operational data with the changed master device.

8. The device according to claim 1, wherein after loading the configuration information of the changed master device, the device comprises at least one of the following reset identifiers:
   a reset identifier for CPU indicating no reset occurred; or
   a reset identifier for DRAM indicating no reset occurred; or
   a reset identifier for communication chips indicating no reset occurred.

9. The device according to claim 1, wherein the master device belongs to a first stacking system, and the device is a member device preparing to join the first stacking system.

10. A method comprising:
   determining that a master device managing a device of a stacking system has changed;
   rolling back a process to a stage prior to loading configuration information;
   obtaining configuration information of a changed master device; and
   loading the configuration information of the changed master device,
   wherein after loading the configuration information of the changed master device, an identifier of kernel startup or an identifier of uboot startup remains unchanged, indicating that no device reboot has occurred.

11. The method according to claim 10, wherein the master device belongs to a first stacking system, and the device is managed by a master device of a second stacking system before the second stacking system to be merged with the first stacking system, and the determining that a master device managing a device of the stack system has changed comprises:
   joining in an election for the master device for a merged stacking system combining the second stacking system and the first stacking system;
   obtaining an election result of the election for the master device in the merged stacking system; and
   based on the election result, determining that the master device managing the device of the stacking system has changed, wherein the election result indicates that no device in the second stacking system serves as the master device of the merged system.

12. The method according to claim 11, wherein the election result further indicates that the master device in the first stacking system serves as the master device of the merged stacking system.

13. The method according to claim 10, wherein the rolling back a process to a stage prior to loading configuration information comprises:
   receiving a rollback message from a process management module; and
   executing a state-by-state rollback to restore the process to the stage prior to loading configuration information.

14. The method according to claim 13, wherein at least two processes exist, and the executing a state-by-state rollback to restore the process to the stage prior to loading configuration information comprises:
   executing the state-by-state rollback in parallel for the at least two processes to restore the at least two processes to the stage prior to loading configuration information.

15. The method according to claim 14, wherein the loading the configuration information to the changed master device comprises:
   in responding to determining that incomplete prerequisite operations exist, executing incomplete prerequisite operations; and
   loading the configuration information of the changed master device.

16. The method according to claim 10, further comprising:
   synchronizing operational data with the changed master device.

17. The method according to claim 10, wherein after loading the configuration information of the changed master device, at least one device of the stacking system has at least one of the following reset identifiers:
   a reset identifier for CPU indicating no reset occurred; or
   a reset identifier for DRAM indicating no reset occurred; or
   a reset identifier for communication chips indicating no reset occurred.

18. The method according to claim 10, wherein the master device belongs to a first stacking system, and the device is a member device preparing to join the first stacking system.

* * * * *